United States Patent
Liu et al.

(10) Patent No.: US 7,391,126 B2
(45) Date of Patent: Jun. 24, 2008

(54) SYSTEMS AND METHODS FOR AN INTEGRATED ELECTRICAL SUB-SYSTEM POWERED BY WIND ENERGY

(75) Inventors: Yan Liu, Ballston Lake, NY (US); Luis Jose Garces, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 48 days.

(21) Appl. No.: 11/427,883

(22) Filed: Jun. 30, 2006

(65) Prior Publication Data

US 2008/0001408 A1   Jan. 3, 2008

(51) Int. Cl.
*H02P 9/00* (2006.01)
(52) U.S. Cl. ......................................................... 290/44
(58) Field of Classification Search ................... 290/44
See application file for complete search history.

(56) References Cited

U.S. PATENT DOCUMENTS

| | | | | |
|---|---|---|---|---|
| 4,118,637 A * | 10/1978 | Tackett | ......................... | 290/55 |
| 4,140,959 A * | 2/1979 | Powell | ......................... | 322/100 |
| 4,189,764 A * | 2/1980 | Snyder | ......................... | 363/97 |
| 4,205,235 A * | 5/1980 | Pal et al. | ........................ | 290/44 |
| 4,206,608 A * | 6/1980 | Bell | ............................ | 60/698 |
| 4,229,661 A * | 10/1980 | Mead et al. | ..................... | 290/44 |
| 5,369,353 A * | 11/1994 | Erdman | ......................... | 323/207 |
| 5,798,631 A * | 8/1998 | Spee et al. | ....................... | 322/25 |
| 6,072,302 A * | 6/2000 | Underwood et al. | .......... | 322/17 |
| 6,100,600 A * | 8/2000 | Pflanz | ......................... | 290/54 |
| 6,175,210 B1 * | 1/2001 | Schwartz et al. | ............. | 318/801 |
| 6,512,966 B2 * | 1/2003 | Lof et al. | ...................... | 700/291 |
| 6,946,751 B2 * | 9/2005 | Yoshida et al. | ................. | 290/44 |
| 7,181,183 B1 * | 2/2007 | Hennessy | .................... | 455/289 |
| 7,199,482 B2 * | 4/2007 | Hopewell | ..................... | 290/44 |
| 7,256,508 B2 * | 8/2007 | Altemark et al. | .............. | 290/44 |
| 2003/0007369 A1 * | 1/2003 | Gilbreth et al. | ................ | 363/35 |
| 2004/0145932 A1 * | 7/2004 | Skeist et al. | .................. | 363/152 |
| 2007/0029802 A1 * | 2/2007 | Moehlenkamp | .............. | 290/44 |

FOREIGN PATENT DOCUMENTS

DE            4232516 A1 *    3/1993

* cited by examiner

*Primary Examiner*—Joseph Waks
(74) *Attorney, Agent, or Firm*—Andrew J. Caruso (57) ABSTRACT

Various embodiments relate to systems and methods related to an integrated electrically-powered sub-system and wind power system including a wind power source, an electrically-powered sub-system coupled to and at least partially powered by the wind power source, the electrically-powered sub-system being coupled to the wind power source through power converters, and a supervisory controller coupled to the wind power source and the electrically-powered sub-system to monitor and manage the integrated electrically-powered sub-system and wind power system.

13 Claims, 10 Drawing Sheets

SYSTEMS AND METHODS FOR AN INTEGRATED ELECTRICAL SUB-SYSTEM POWERED BY WIND ENERGY

GOVERNMENT FUNDING

The present subject matter was made with Government support under contract number DE-AC36-99GO10337 awarded by the Department of Energy, National Renewable Energies Laboratory, subcontract number YAM-4-33200-09. The United States government may have certain rights in the invention.

FIELD OF TECHNOLOGY

Various embodiments relate to electrically powered subsystems and a wind power generator. Particularly, embodiments relate to the integration of electrically powered subsystems with a wind turbine generator.

BACKGROUND

Worldwide water needs are increasing rapidly and factors such as population growth, increased industrial usage and pollution of existing supplies may limit many countries' capability to satisfy freshwater demands in the future. The development of new water resources through the purification of impaired resources is seen as a critical technology for meeting future water needs. Existing desalination techniques are characterized by large energy expenditures to generate potable water. The associated cost of energy is one of the dominant factors in the water desalination economy.

One purification technique, reverse osmosis, is gaining increased acceptance as a viable desalination technique due to its low energy consumption and its design flexibility. But in water starved areas and remote, inland areas where electric grid connectivity is limited, the energy cost associated with reverse osmosis based desalination may render the desalination solution as economically infeasible. Wind energy provides an important source of power for these regions and other areas where the cost of energy from other sources is high or unavailable.

Desalination is only one example of an electrically powered sub-system that could benefit from wind energy. Other examples of electrically powered sub-systems include electrical power storage devices, such as batteries, hydrogen electrolysis systems, variable speed pumping systems, and the like. Conventional systems have not integrated these types of electrically powered sub-systems with wind energy sources.

Thus, systems and methods for providing integration of an electrically-powered sub-system and a wind power source are needed.

DESCRIPTION OF THE DRAWINGS

Various embodiments may be understood by referring to the following description and accompanying drawings that illustrate such embodiments. In the drawings.

DETAILED DESCRIPTION

Various embodiments relate to systems and methods for providing integration of an electrically-powered sub-system and a wind power source.

References in the specification to "one embodiment," "various embodiments", "an embodiment," "an example embodiment," indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one of ordinary skill in the art to affect such feature, structure, or characteristic in connection with other embodiments whether or not explicitly described.

Approximating language, as used herein throughout the specification and claims, may be applied to modify any quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value.

In the drawings, like numerals describe substantially similar components throughout the several views. These embodiments are described in sufficient detail to enable one of ordinary skill in the art to practice the present invention.

Various embodiments described and claimed herein relate to systems and methods for providing integration of an electrically-powered sub-system and a wind power source as substitutes for well-established electrically-powered sub-system technologies that use either fossil fuel power plants or grid energy. One of the challenges addressed by the integration of electrically-powered sub-systems and wind power sources is system design for minimizing the cost of operating the electrically-powered sub-system, while maintaining operability over a large power envelope, robustness to input power variations, and management of multiple, often conflicting, requirements. While integrated electrically-powered sub-systems and wind power sources with advanced operations can be developed, its effectiveness must be measured in terms of its energy consumption and ultimately the cost of the output that the electrically-powered sub-system produces.

Various embodiments effectively deal with the constraints of variable power input on electrically-powered sub-system operations to arrive at processes capable of accommodating a wide range of wind turbine power variation while still remaining economically viable. Various embodiments illustrate component designs for the major components of the integrated electrically-powered sub-systems and wind power sources and their integration into a system-level implementation. The component designs include a wind turbine power generation system or a wind farm, an electrically-powered sub-system (e.g. reverse osmosis desalination, vapor compression desalination, electrical power storage devices, such as batteries, hydrogen electrolysis systems, variable speed pumping systems, and the like), grid connectivity systems (if necessary or available), energy recovery devices, and energy storage. The component designs provide information for one or more effectors to modify an operating point in the electrically-powered sub-system and/or power generation system. An effector may be defined as a device used to produce a desired change in an object in response to input, for example. Some types of effectors used may be supervisory controllers, valves, or variable frequency drives, for example. The effectors may also respond to external disturbances, such as feed water temperature or concentration, flow rate, and variations in the power supplied to the electrically-powered sub-system, for example.

Further, various embodiments also relate to techniques for sizing and evaluating an integrated electrically-powered sub-systems and wind power source while either grid connected or grid isolated with energy storage. Various embodiments are illustrated generally with the use of a wind turbine generator as the wind power source and reverse osmosis desalination as an example of an integrated electrically-powered sub-system, but the embodiments are not so limited and can be applied to various alternative applications. For example, other electrically-powered sub-systems (e.g. vapor compression desalination, electrical power storage devices, such as batteries, hydrogen electrolysis systems, variable speed pumping systems, and the like) may also be used.

Wind speed is highly variable, geographically and temporally, and varies over a multitude of temporal and spatial time scales. In terms of power generation using a wind turbine, this variation is amplified by the fact that the available energy in the wind varies as the cube of the wind speed. Careful consideration of the location/site of a wind generator, wind farm, or any other plant that relies on the exploitation of the wind resource for power generation is essential in order to ensure superior economic performance.

Figure 1:
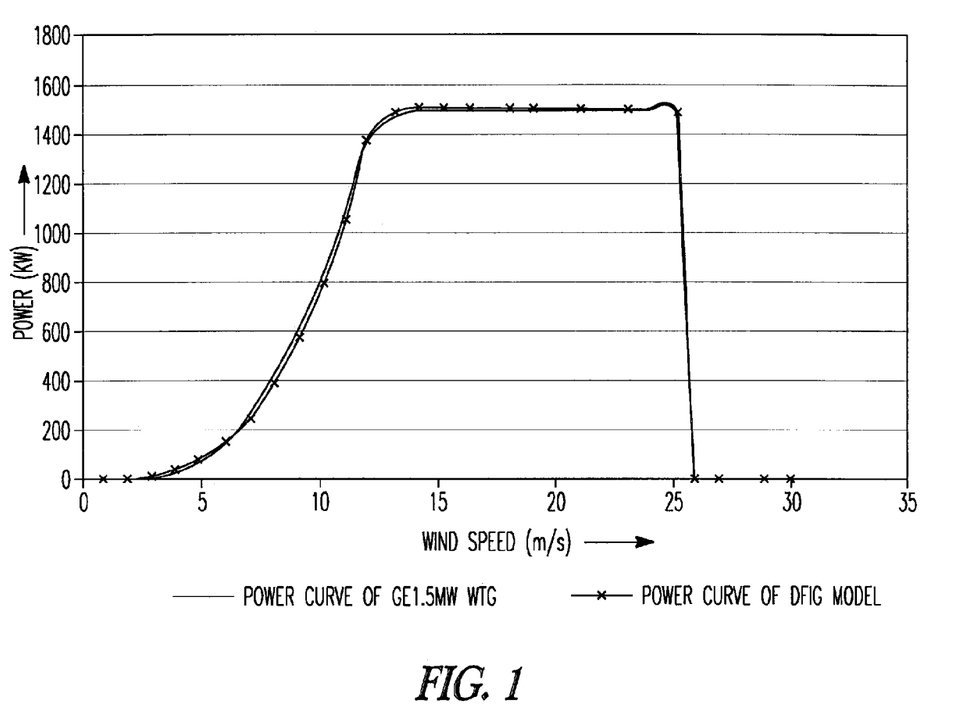
FIG. 1 illustrates a graphical view of a grid-connected doubly fed induction generator (DFIG) model validated against the power curve of a wind turbine generator, according to various embodiments.

In regard to one embodiment, a grid-connected doubly fed induction generator (DFIG) model was validated against the power curve of a conventional 1.5 MW wind turbine generator. The comparison result is shown in FIG. 1.

Figure 2:
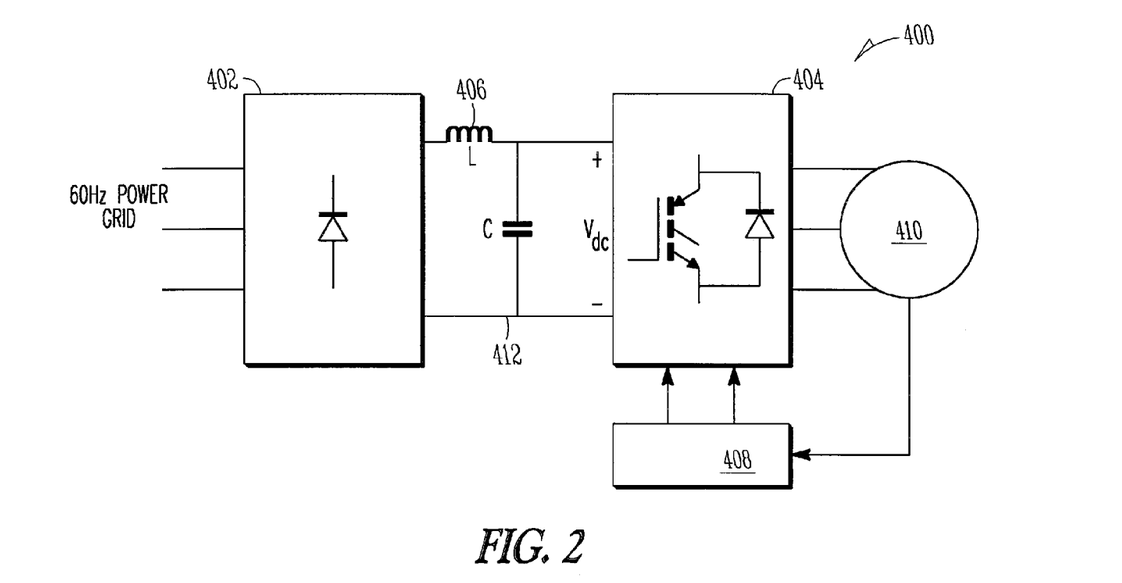
FIG. 2 illustrates a diagram of a variable speed motor drive and an AC motor, according to various embodiments.

Variable speed drives can be used as components in the electrical system and can be used as movers of the water pumps in embodiments with electrically-powered sub-systems having pumps. Variable speed drives can be controlled and constrained by the electrically-powered sub-system operation requirements as well as the wind turbine generator power and stability requirements. Referring to FIG. 2, a diagram 400 of a variable speed motor drive and induction motor is shown, according to various embodiments. A typical AC (alternating current) motor drive may comprise a passive or active rectifier 402, a DC (direct current) link capacitor 412 and a variable frequency inverter 404, which regulates the speed (frequency) and torque (current) 408 of the alternating current motor 410. The AC motor can be an induction synchronous motor, or any type of synchronous motor such as a permanent magnet, synchronous reluctance or wound field synchronous machine. A filter 406 may be placed between the rectifier 402 and inverter 404.

Figure 3:
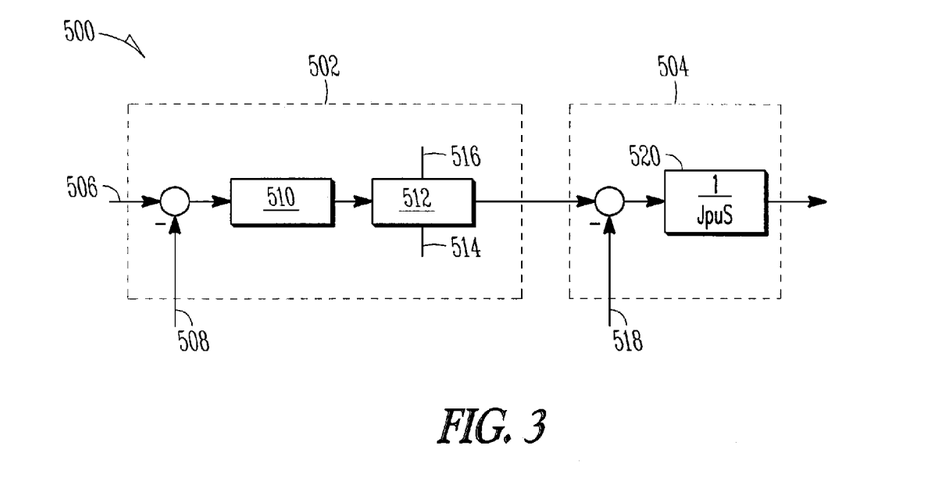
FIG. 3 illustrates a diagram of a variable speed drive and motor model, according to various embodiments.

Because the power electronic controls may have a very high bandwidth and given the relatively large time constant of the electrically-powered sub-system, fast transients may be simplified to only capture the speed (frequency) and torque (current) control behaviors of the machine. A simplified model 500 of variable speed drive 502 and motor 504 is illustrated in FIG. 3, according to various embodiments. The control block 510 of variable speed drive 502 is used to regulate speed by measuring the speed feedback 508 from the motor 504, as compared to the speed reference 506. The fast acting torque regulator 512 may be controlled with a gain 514 and a variable torque limiter 516, whose value is provided by the wind turbine generator. This ensures that the motor always operates within the available power supplied by the wind turbine generator. The output of the torque regulator 512 is then be subtracted from the load torque 518 that represents the pump load, with the result fed to the integrator 520 representing the actual machine plus pump inertia. This model has the capability of taking into consideration the variable power (current) from the wind turbine generator and regulating the current and in turn, controlling the torque and speed of the motor 504.

Due to the stochastic nature and variability of the wind resource (and consequently, the variability of the power generated by a wind turbine), the electrically-powered sub-system is designed to operate at different levels of available power. In particular, for grid-isolated sub-systems without any electrical storage means, the amount of output produced by the electrically-powered sub-system will vary with the wind speed and with the power supplied to the electrically-powered sub-system. Specifically, at higher wind speeds, when more power is available, higher output rates from the electrically-powered sub-system can be processed.

The power consumed by the electrically-powered sub-system and the power generated by the wind turbine are equal only if a grid-isolated case with no energy storage is considered. For grid-connected configurations as described below, the power consumption of the electrically-powered sub-system may at times exceed or be surpassed by the amount of power generated. When there exists a mismatch between power production and consumption, the difference can be covered by purchasing energy from or selling energy to the grid. Also, energy can be drawn from or spent on charging a battery system (if such an energy storage system is present). Energy purchases and sales have an impact on the specific cost of the output produced by the electrically-powered subsystem, depending on the energy purchase and sale prices. No cost is associated with disposing of the excess energy generated by the turbine, in case that energy sale to the grid is not possible. When no grid connection is available, the electrically-powered sub-system will idle when the wind turbine does not generate power, the electrically-powered sub-system output being reduced to zero.

Typically, electrically-powered sub-systems have been developed for operation at nearly constant electrical input conditions. In cases where the grid power is not available or expensive, an integrated electrically-powered sub-system and wind power system needs to operate under a large range of variations in available power. The economical viability of the integrated electrically-powered sub-system and wind power system depends in part on the ability of the integrated electrically-powered sub-system and wind power system to efficiently produce output in most of this range. The possible plant configurations described below are meant to provide a large degree of flexibility to operate the integrated electrically-powered sub-system and wind power system in a wide range of conditions dictated by available power, wind conditions, and electrically-powered sub-system state. As described below, several alternative embodiments of an integrated electrically-powered sub-system and wind power system are presented. In a first set of examples, the integrated electrically-powered sub-system and wind power system is connected to an electrical grid offering an uninterrupted source of power and a means to sell back unused wind generated power. In a second set of examples, grid disconnected embodiments and embodiments using other power generation sources are presented.

Figure 4:
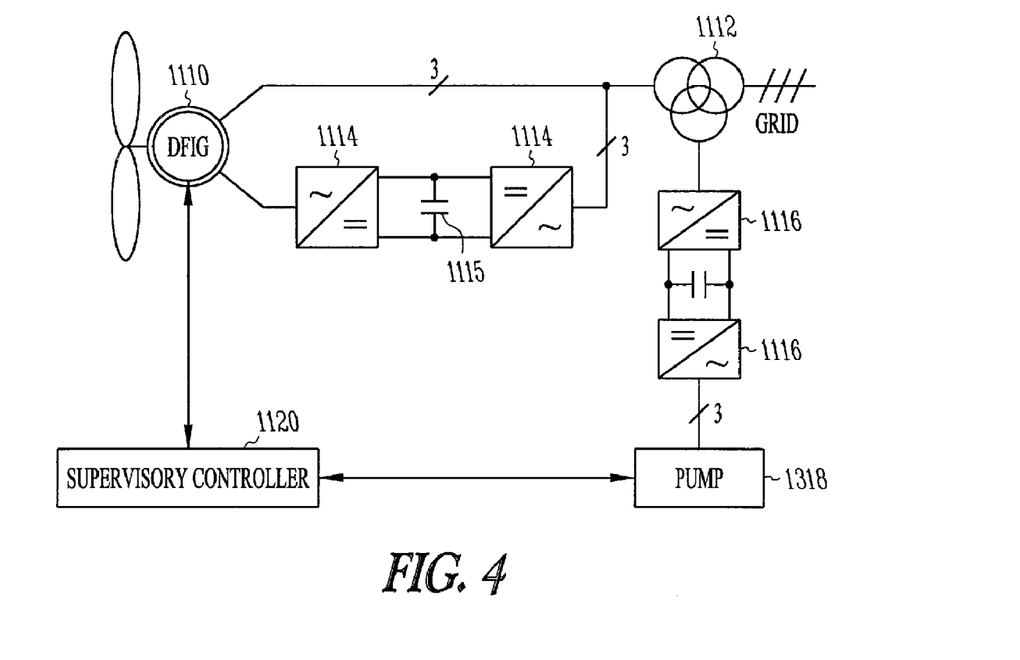
FIG. 4 illustrates an embodiment of the grid-connected integrated electrically-powered sub-system and wind power system with a doubly fed induction wind turbine generator (DFIG).
Figure 5:
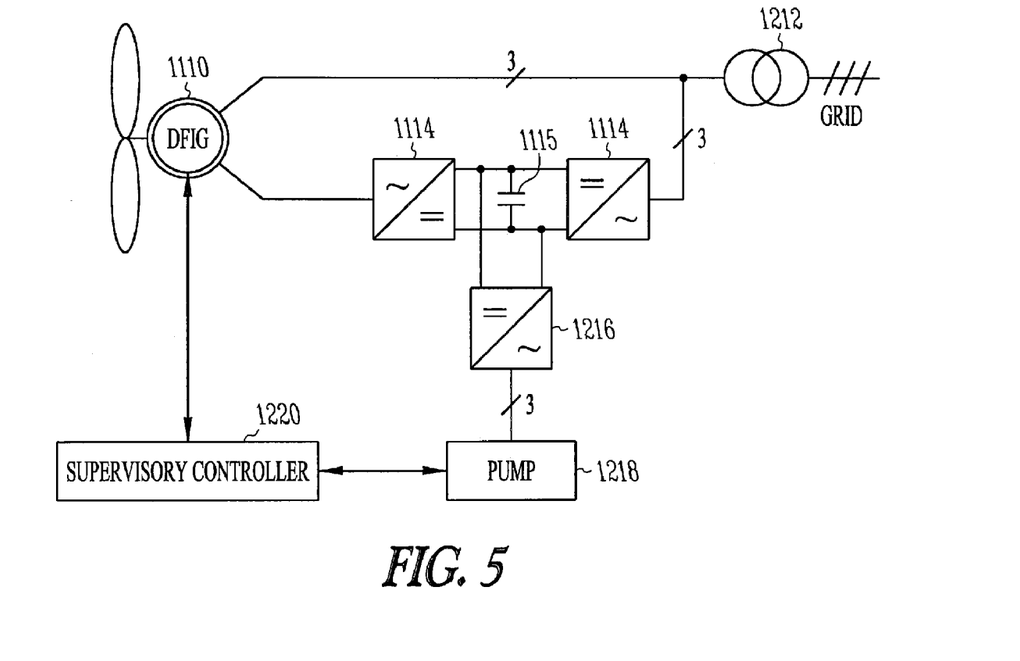
FIG. 5 illustrates an alternative embodiment of the grid-connected integrated electrically-powered sub-system and wind power system with a doubly fed induction wind turbine generator (DFIG).

Given the greater flexibility of a grid connected topology, there are many opportunities for optimal design and optimal operation efficiency in an integrated electrically-powered sub-system and wind power system. For the grid connected case, FIGS. 4-5 illustrate various embodiments of the integrated electrically-powered sub-system and wind power system. In these embodiments, a conventional 1.5 MW doubly fed induction wind turbine generator (DFIG) is used as the wind power source. It will be apparent to those of ordinary skill in the art that other types of wind power systems and other conventional available sizes of a DFIG wind turbine generator may equivalently be used in the system designs illustrated in FIGS. 9 and 10.

FIG. 4 illustrates an example of a grid-connected integrated electrically-powered sub-system and wind power system using a DFIG wind turbine generator 1110. A three-phase/three windings transformer 1112 can be used to connect one feed of generator 1110 to the electrical grid. A second feed of generator 1110 connected to its three phase rotor winding is fed through a pair of back-to-back power converters 1114. Back-to-back power converters 1114 are electrically tied through a large capacitor 1115 and a DC link. The back-to-back power converters 1114 are provided to regulate the voltage between the two feeds of the DFIG generator 1110 and the generated torque and reactive power. An electrically-powered sub-system, represented in FIG. 4 as variable speed pump 1118 (e.g. electrically-powered sub-systems can also include reverse osmosis desalination sub-systems, vapor compression desalination sub-systems, electrical power storage devices, such as batteries, hydrogen electrolysis systems, variable speed pumping systems, and the like), can be connected to and at least partially powered by the generator 1110 and the grid via transformer 1112 and a pair of back-to-back power converters 1116. The back-to-back power converters 1116 are provided to transform the variable amplitude/variable frequency voltage present at the output of the generator 1110 into a constant frequency/constant voltage for a constant speed pump or a variable voltage/variable frequency output for a variable speed pump in the electrically-powered sub-system 1118. The back-to-back power converters 1116 are electrically tied through a large capacitor 1117 and a DC link. A supervisory controller 1120 is also coupled between the generator 1110 and the electrically-powered sub-system 1118. Supervisory controller 1120 monitors the output of both the generator 1110 and the electrically-powered sub-system 1118 and manages the power needs of electrically-powered sub-system 1118 given the power available from generator 1110 and the grid based on configurable operating parameters. Supervisory controller 1120 can be used to match the output of the electrically-powered sub-system 1118 to the power generated by generator 1110 to minimize the power extracted from the grid. Supervisory controller 1120 may similarly be wirelessly connected to the generator 1110 and the electrically-powered sub-system 1118. Further, supervisory controller 1120 can be Internet-connected to provide a network data link for the remote monitoring and management of the integrated electrically-powered sub-system and wind power system. The embodiment shown in FIG. 4 provides the advantage that the transformer 1112 can provide grid connectivity for both the generator 1110 and the electrically-powered sub-system 1118.

FIG. 5 illustrates an embodiment of the grid-connected integrated electrically-powered sub-system and wind power system with the electrically-powered sub-system 1218 connected directly to the DC link of the back-to-back power converters 1114 via power converter 1216. In this case, the grid side converter of back-to-back power converters 1114 must be sized appropriately in order to account for the additional power going to the electrically-powered sub-system 1218. In this embodiment, because the electrically-powered sub-system 1218 is fed directly via power converter 1216, the use of additional AC-DC converters and output transformer for variable speed pumps can be omitted. For illustration purposes only, the embodiments shown in FIGS. 4-5 include a doubly fed induction generator 1110. A similar system topology can also be used for other types of wind turbine generators, such as those previously mentioned. For example, an alternate system with a permanent magnet (PM) type wind power generator 1610 is shown in FIG. 6.

Figure 6:
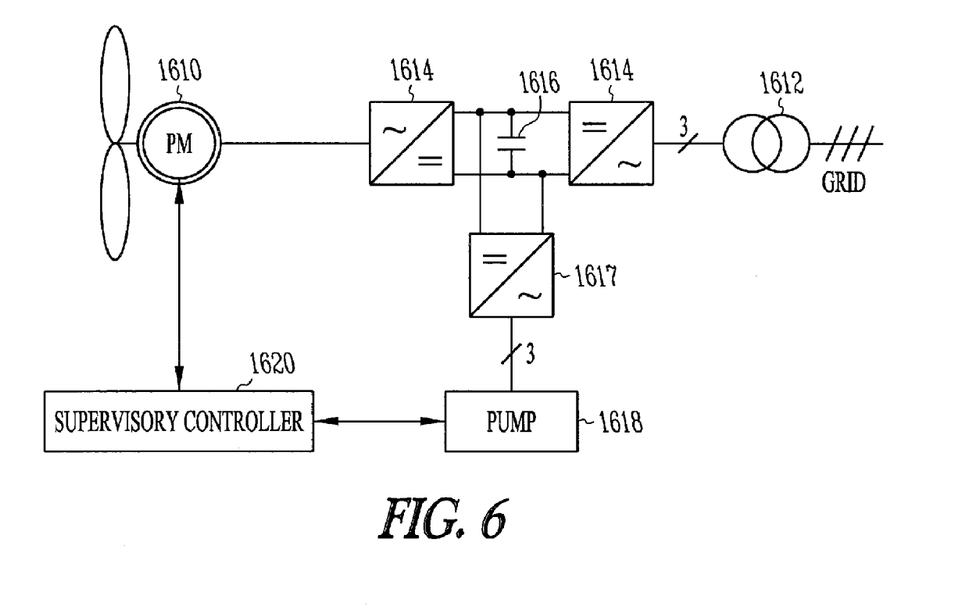
FIG. 6 illustrates an embodiment of the grid-connected integrated electrically-powered sub-system and wind power system with a permanent magnet (PM) wind power generator.

FIG. 6 illustrates an example of a grid-connected integrated electrically-powered sub-system and wind power system using a PM wind power generator 1610. In this embodiment, a transformer 1612 can be used to connect PM wind power generator 1610 to the electrical grid via a pair of back-to-back power converters 1614. Back-to-back power converters 1614 are electrically tied through a large capacitor 1616 and a DC link. The back-to-back power converters 1614 are provided to regulate the voltage between the PM generator 1610 and the grid. An electrically-powered sub-system, represented in FIG. 6 as pump 1618 (e.g. electrically-powered sub-systems can also include reverse osmosis desalination sub-systems, vapor compression desalination sub-systems, electrical power storage devices, such as batteries, hydrogen electrolysis systems, variable speed pumping systems, and the like), can be connected to the generator 1610 via a converter 1617, which is tied to the DC link between back-to-back power converters 1614. A supervisory controller 1620 is also coupled between the generator 1610 and the electrically-powered sub-system 1618. Supervisory controller 1620 monitors the output of both the generator 1610 and the electrically-powered sub-system 1618 and manages the power needs of electrically-powered sub-system 1618 given the power available from generator 1610 and the grid based on configurable operating parameters.

Figure 7:
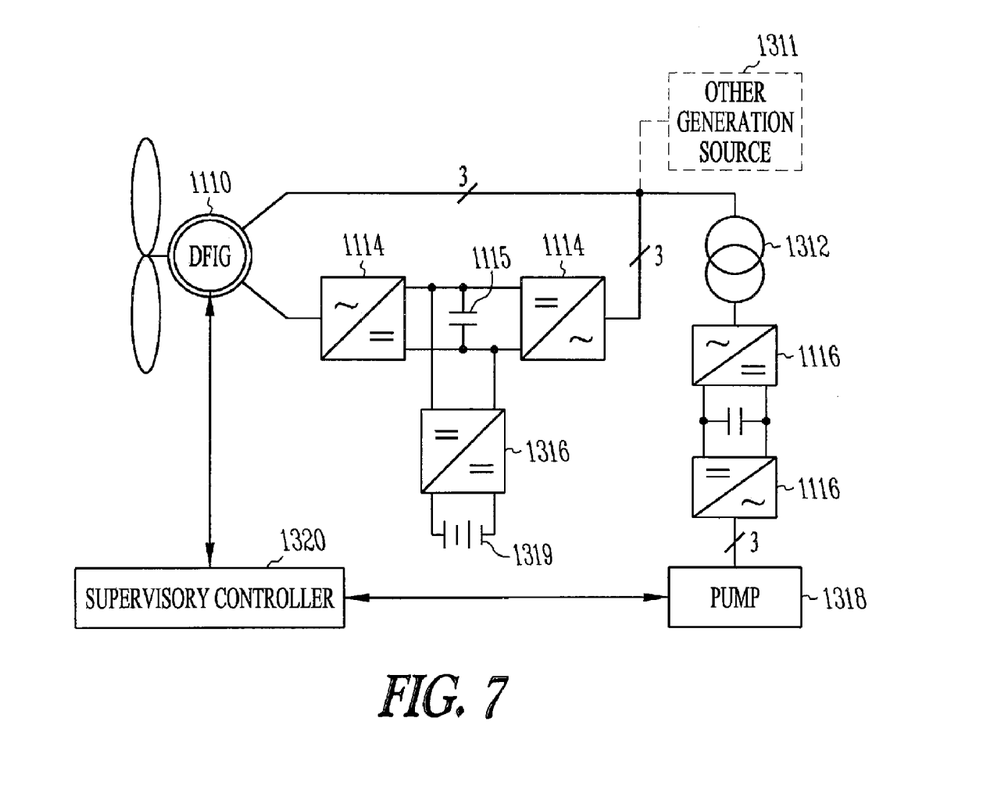
FIG. 7 illustrates an embodiment of the grid-disconnected integrated electrically-powered sub-system and wind power system with a doubly fed induction wind turbine generator (DFIG).

In FIGS. 7-11, various embodiments are shown as examples of grid disconnected or grid-isolated embodiments and embodiments using other power generation sources. Referring to FIG. 7, an example of a grid-disconnected integrated electrically-powered sub-system and wind power system using a DFIG wind turbine generator 1110 is shown. In this embodiment, a transformer 1312 can be used to connect one feed of generator 1110 to electrically-powered sub-system 1318 via a pair of back-to-back power converters 1116. The generator 1110 can thus be used to at least partially power the electrically-powered sub-system 1318. The transformer 1312 can be omitted if there is no concern about fault protection. The back-to-back power converters 1116 are provided to transform the variable amplitude/variable frequency voltage present at the output of the generator 1110 into a different frequency/constant voltage for a pump or other output generator in the electrically-powered sub-system 1318. The back-to-back power converters 1116 are electrically tied through a large capacitor 1117 and a DC link. A second feed of generator 1110 is fed through a pair of back-to-back power converters 1114 connected to the rotor of the wound rotor induction machine. Back-to-back power converters 1114 are electrically tied through a large capacitor 1115 and a DC link. The back-to-back power converters 1114 are provided to regulate the torque and reactive power of the asynchronous generator. A battery 1319 is coupled to the DC link between back-to-back power converters 1114 via a power converter (e.g. a buck converter) 1316. The battery 1319 at the DC link of the back-to-back power converters 1114 provides black-start (i.e. cold start) power and smooth transients as well as providing power for the control and auxiliary equipment. It will be apparent to those of ordinary skill in the art that other types of power storage devices other than batteries may similarly be used (e.g. flywheels, hydro-electric devices, and the like). The buck converter 1316 is provided to step down the DC link voltage to the lower battery voltage, if required. A supervisory controller 1320 is also coupled between the generator 1110 and the electrically-powered sub-system 1318. Supervisory controller 1320 monitors the output of both the generator 1110 and the electrically-powered sub-system 1318 and manages the power needs of electrically-powered sub-system 1318 given the power available from generator 1110 based on configurable operating parameters. In addition, other power generation sources 1311, such as a combustion engine (e.g. a diesel motor), fuel cells, batteries, and/or combinations thereof can also be coupled to the integrated system to provide a "virtual grid". In this configuration, no changes need to be made to the conventional wind power generation system 1110 when the other power sources can act as master to provide the required grid frequency. The electrically-powered sub-system 1318 can be connected to the other generation sources 1311 via transformer 1312 and back-to-back power converters 1116. In this configuration, the other generation sources 1311 can be used to augment or replace power normally provided by generator 1110.

Figure 8:
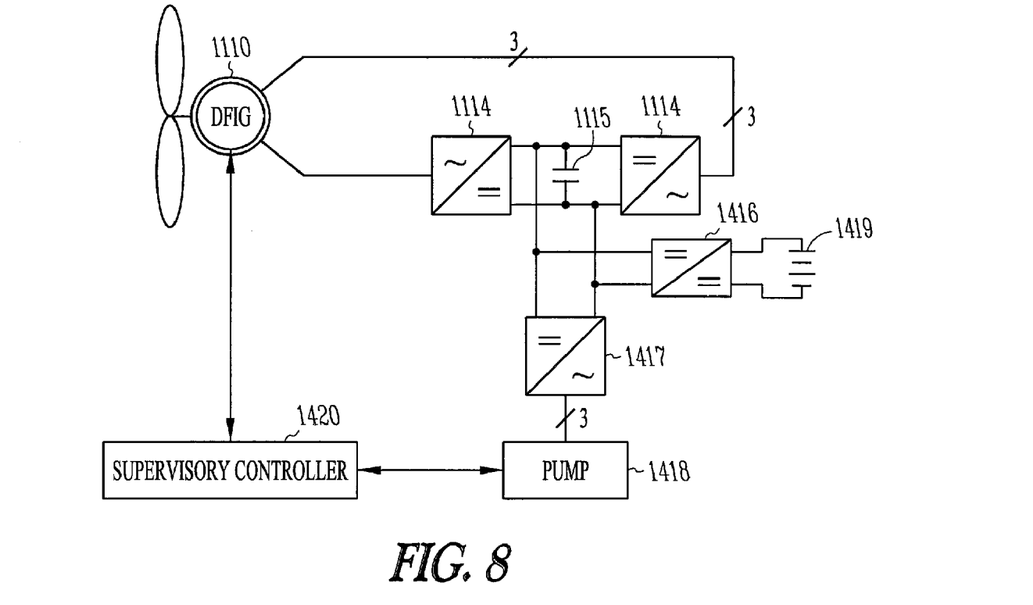
FIG. 8 illustrates an alternative embodiment of the grid-disconnected integrated electrically-powered sub-system and wind power system with a doubly fed induction wind turbine generator (DFIG).

FIG. 8 illustrates an embodiment of the grid-disconnected integrated electrically-powered sub-system and wind power system with the electrically-powered sub-system 1418 connected directly to the DC link of the back-to-back converters 1114 via converter 1417. A battery 1419 is coupled to the DC link between back-to-back power converters 1114 via a buck converter 1416. The battery 1419 at the DC link of the back-to-back power converters 1114 provides black-start (i.e. cold start) power and smooth transients as well as providing power for the control and auxiliary equipment. The buck converter 1416 is provided to step down the DC link voltage to the lower battery voltage, if required. A supervisory controller 1420 is also coupled between the generator 1110 and the electrically-powered sub-system 1418. Supervisory controller 1420 monitors the output of both the generator 1110 and the electrically-powered sub-system 1418 and manages the power needs of electrically-powered sub-system 1418 given the power available from generator 1110 based on configurable operating parameters.

Figure 9:
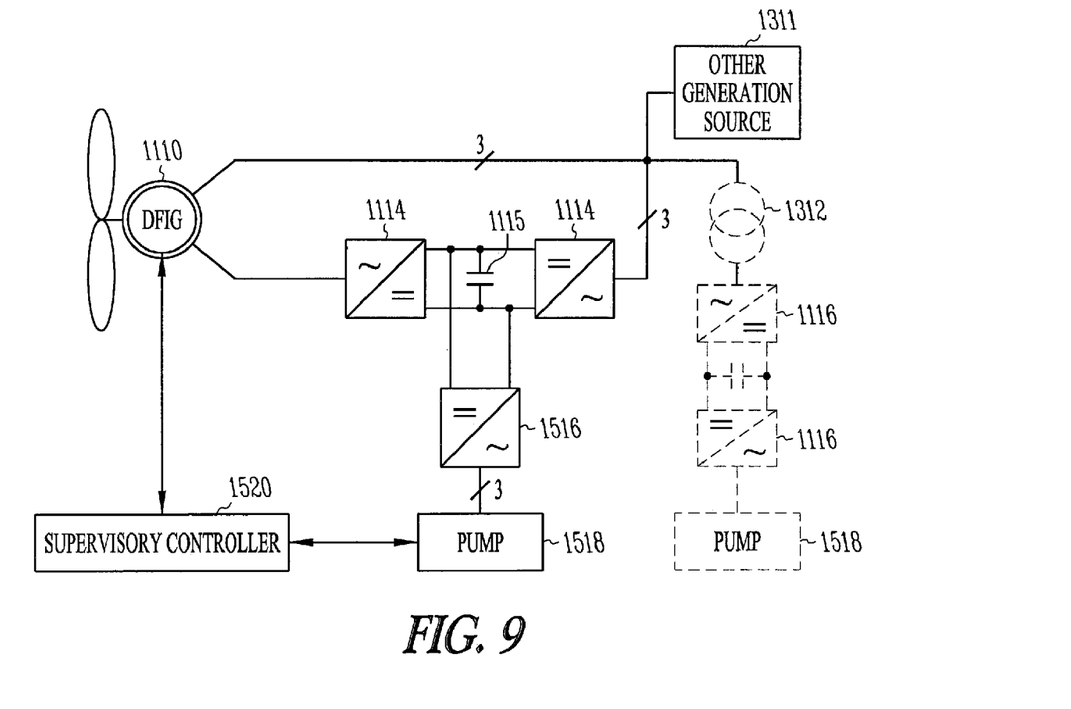
FIG. 9 illustrates another alternative embodiment of the grid-disconnected integrated electrically-powered sub-system and wind power system with a doubly fed induction wind turbine generator (DFIG).

FIG. 9 illustrates an example of a grid-disconnected integrated electrically-powered sub-system and wind power system using a DFIG wind turbine generator 1110. In one variation of this embodiment, a transformer 1312 can be used to connect one feed of generator 1110 to electrically-powered sub-system 1518 via a pair of back-to-back power converters 1116. The transformer 1312 can be omitted if there is no concern about fault protection. The back-to-back power converters 1116 can be provided to transform the variable amplitude/variable frequency voltage present at the output of the generator 1110 into a different frequency/voltage for electrically-powered sub-system 1518. The back-to-back power converters 1116 are electrically tied through a large capacitor and a DC link. A second feed of generator 1110 is fed through a pair of back-to-back power converters 1114. Back-to-back power converters 1114 are electrically tied through a large capacitor 1115 and a DC link. The back-to-back power converters 1114 are provided to regulate the voltage between the two feeds of the DFIG generator 1110. In another variation of this embodiment, electrically-powered sub-system 1518 is tied to the DC link between converters 1114 via converter 1516. A supervisory controller 1520 is also coupled between the generator 1110 and the electrically-powered sub-system 1518. Supervisory controller 1520 monitors the output of both the generator 1110 and the electrically-powered sub-system 1518 and manages the power needs of electrically-powered sub-system 1518 given the power available from generator 1110 based on configurable operating parameters. In addition, other generation sources 1311, such as a combustion engine (e.g. a diesel motor), fuel cells, batteries, and/or combinations thereof, can also be coupled to the integrated system to provide a "virtual grid". In this configuration, no changes need to be made to the conventional wind power generation system 1110. The electrically-powered sub-system 1518 can be connected to the other generation sources 1311 via transformer 1312 and back-to-back power converters 1116 or via back-to-back power converters 1114 and converter 1516. For illustration purposes only, the embodiments shown in FIGS. 7-9 include a doubly fed induction generator 1110. A similar system topology can also be used for other types of wind turbine generators, such as those previously mentioned. Alternate embodiments with a permanent magnet (PM) type wind power generator 1610 are shown in FIGS. 10-11.

Figure 10:
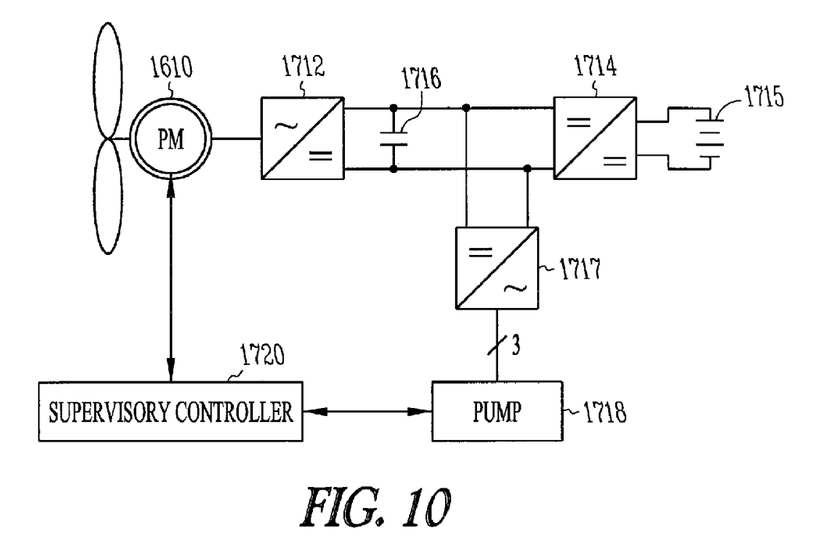
FIG. 10 illustrates an embodiment of the grid-disconnected integrated electrically-powered sub-system and wind power system with a permanent magnet (PM) wind power generator.

FIG. 10 illustrates an embodiment of the grid-disconnected integrated electrically-powered sub-system and wind power system with a PM wind power generator 1610 and the electrically-powered sub-system 1718 connected directly to the DC side of the converter 1712 via converter 1717. A battery 1715 is coupled to the DC side of the converter 1712 via a buck converter 1714. The battery 1715 provides black-start (i.e. cold start) power and smooth transients as well as providing power for the control and auxiliary equipment. The buck converter 1714 is provided to step down the DC voltage to the lower battery voltage, if required. A supervisory controller 1720 is also coupled between the PM generator 1610 and the electrically-powered sub-system 1718. Supervisory controller 1720 monitors the output of both the generator 1610 and the electrically-powered sub-system 1718 and manages the power needs of electrically-powered sub-system 1718 given the power available from generator 1610 based on configurable operating parameters.

Figure 11:
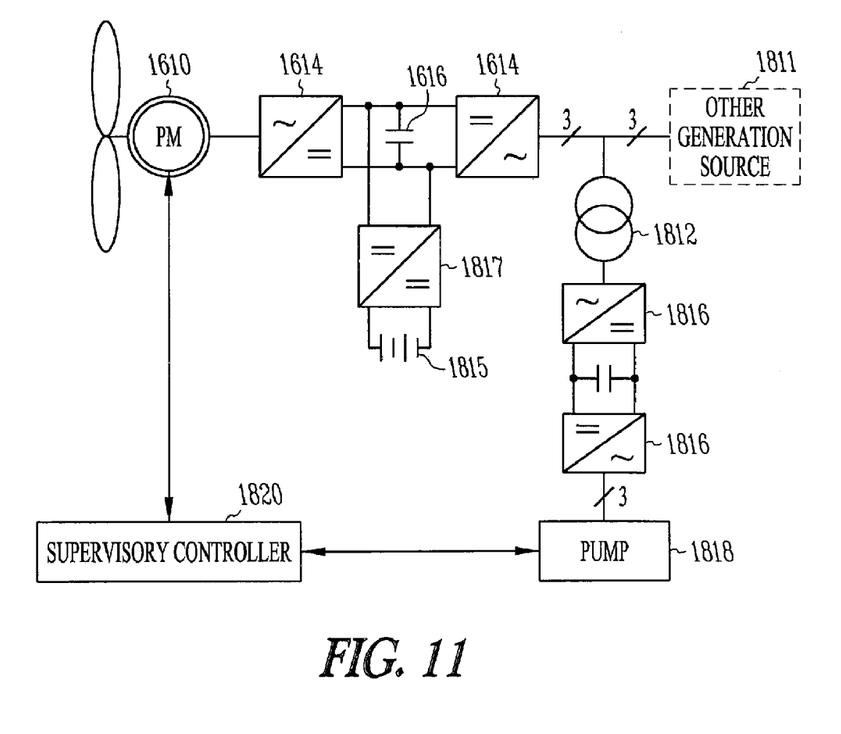
FIG. 11 illustrates an alternative embodiment of the grid-disconnected integrated electrically-powered sub-system and wind power system with a permanent magnet (PM) wind power generator.

Referring to FIG. 11, an example of a grid-disconnected integrated electrically-powered sub-system and wind power system using a PM wind generator 1610 is shown. In this embodiment, a transformer 1812 can be used to connect the output of generator 1610 to electrically-powered sub-system 1818 via a pair of back-to-back power converters 1816. The transformer 1812 can be omitted if there is no concern about fault protection. The back-to-back power converters 1816 are provided to transform the variable amplitude/variable frequency voltage present at the output of the generator 1610 into a constant frequency/constant voltage for electrically-powered sub-system 1818. The back-to-back power converters 1816 are electrically tied through a large capacitor and a DC link. The output of generator 1610 is also fed through a pair of back-to-back power converters 1614. Back-to-back power converters 1614 are electrically tied through a large capacitor 1616 and a DC link. The back-to-back power converters 1614 are provided to regulate the voltage between the other generation sources 1811 and the PM generator 1610. A battery 1815 is coupled to the DC link between back-to-back power converters 1614 via a buck converter 1817. The battery 1815 at the DC link of the back-to-back power converters 1614 provides black-start (i.e. cold start) power and smooth transients as well as providing power for the control and auxiliary equipment. The buck converter 1817 is provided to step down the DC link voltage to the lower battery voltage, if required. A supervisory controller 1820 is also coupled between the PM generator 1610 and the electrically-powered sub-system 1818. Supervisory controller 1820 monitors the output of both the generator 1610 and the electrically-powered sub-system 1818 and manages the power needs of electrically-powered sub-system 1818 given the power available from generator 1610 based on configurable operating parameters. In addition, other generation sources 1811, such as a combustion engine (e.g. a diesel motor), fuel cells, batteries, and/or combinations thereof, can also be coupled to the integrated system to provide a "virtual grid". The electrically-powered sub-system 1818 can be connected to the other generation sources 1811 via transformer 1812 and back-to-back power converters 1816.

Figure 12:
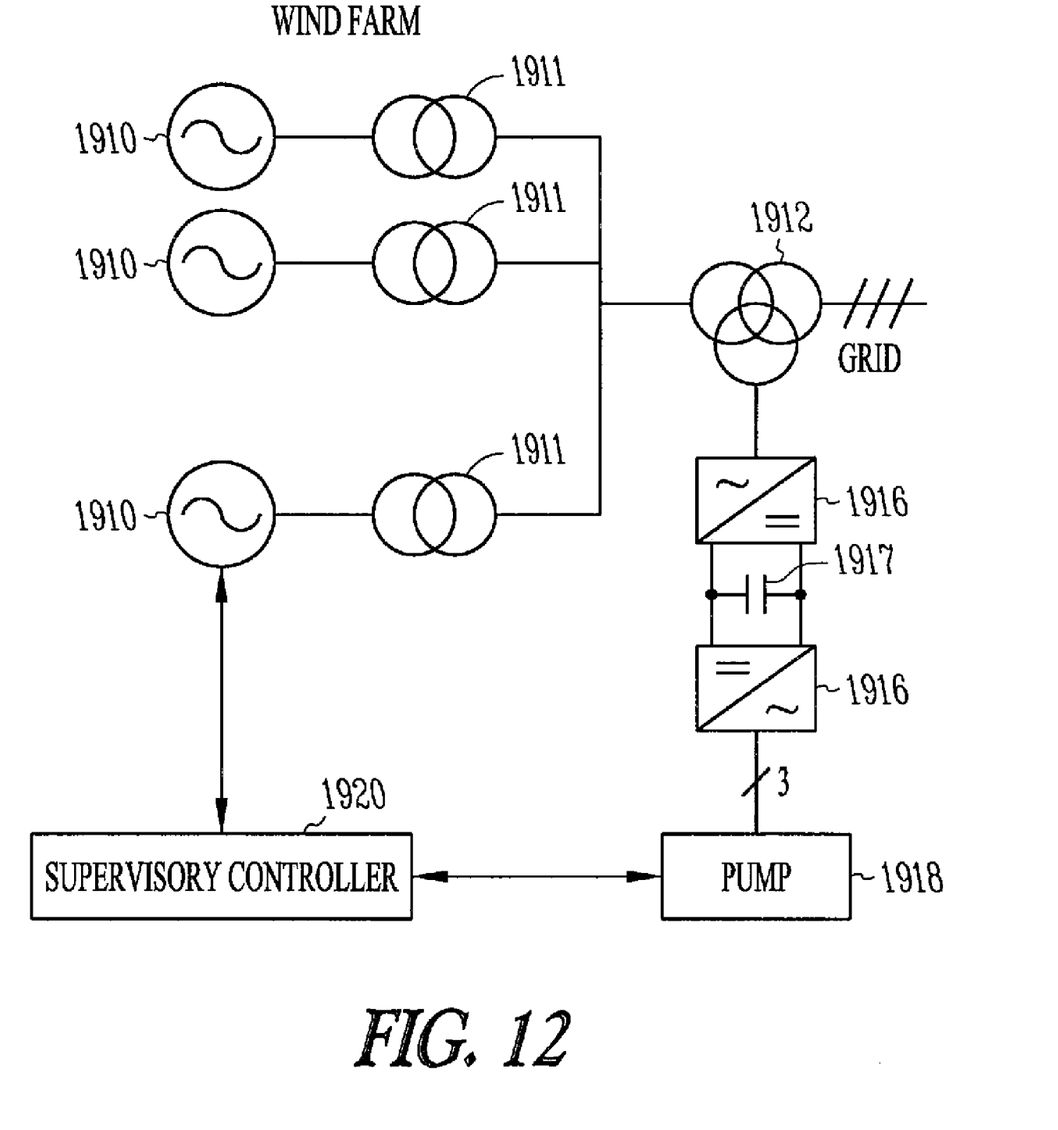
FIG. 12 illustrates an embodiment of the grid-connected integrated electrically-powered sub-system and wind power system with power generation from a wind farm.
Figure 13:
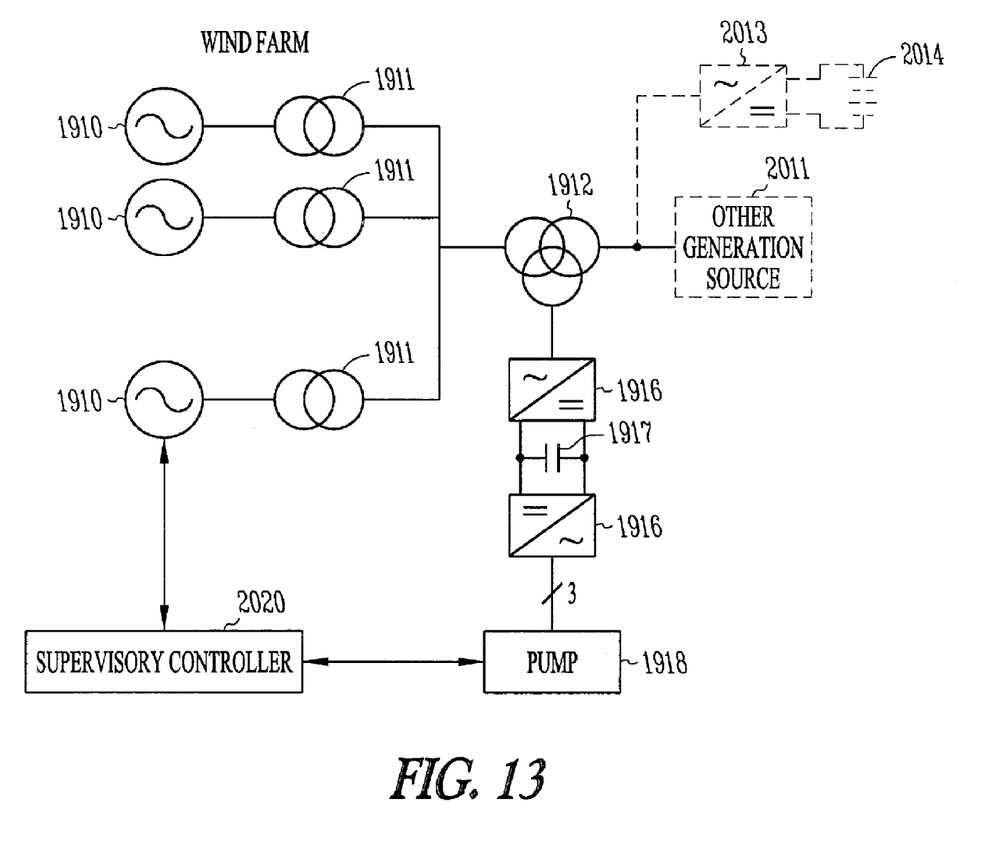
FIG. 13 illustrates an embodiment of the grid-disconnected integrated electrically-powered sub-system and wind power system with power generation from a wind farm.

In the embodiments described above, a single wind power generator is shown. However, it will be apparent to those of ordinary skill in the art that multiple wind power generators can be aggregated into wind farms to provide a more powerful and robust wind power source. FIGS. 12 and 13 illustrate various embodiments of a grid-connected (FIG. 12) and a grid-disconnected (FIG. 13) integrated electrically-powered sub-system and wind power system using a wind farm 1910. FIG. 12 illustrates wind farm 1910 coupled to the grid via an array of transformers 1911 and a three-phase/three windings transformer 1912. The electrically-powered sub-system 1918 is coupled to the transformer 1912 via a pair of back-to-back power converters 1916. Back-to-back power converters 1916 are electrically tied through a large capacitor 1917 and a DC link. A supervisory controller 1920 is also coupled between the wind farm 1910 and the electrically-powered sub-system 1918. Supervisory controller 1920 monitors the output of both the wind farm 1910 and the electrically-powered sub-system 1918 and manages the power needs of electrically-powered sub-system 1918 given the power available from wind farm 1910 based on configurable operating parameters.

Referring to FIG. 13, an example of a grid-disconnected integrated electrically-powered sub-system and wind power system using a wind farm 1910 is shown. In this embodiment, a transformer 1912 can be used to connect the output of wind farm 1910 to electrically-powered sub-system 1918 via an array of transformers 1911 and a pair of back-to-back power converters 1916. The transformer 1912 can be omitted if there is no concern about fault protection. The back-to-back power converters 1916 are provided to transform the variable amplitude/variable frequency voltage present at the output of the wind farm 1910 into a constant frequency/constant voltage for electrically-powered sub-system 1918. The back-to-back power converters 1916 are electrically tied through a large capacitor 1917 and a DC link. A battery 2014 is coupled to transformer 1912 and other generation sources 2011. The battery 2014 provides black-start (i.e. cold start) power and smooth transients as well as providing power for the control and auxiliary equipment. A supervisory controller 2020 is also coupled between the wind farm 1910 and the electrically-powered sub-system 1918. Supervisory controller 2020 monitors the output of both the wind farm 1910 and the electrically-powered sub-system 1918 and manages the power needs of electrically-powered sub-system 1918 given the power available from wind farm 1910 based on configurable operating parameters. In addition, other generation sources 2011, such as a combustion engine (e.g. a diesel motor), fuel cells, batteries, and/or combinations thereof, can also be coupled to the integrated system to provide a "virtual grid". The electrically-powered sub-system 1918 can be connected to the other generation sources 2011 via transformer 1912 and back-to-back power converters 1916. As described above, the wind farm generators 1910 can be DFIG, PM, induction machines, or other conventional types of wind power generators.

Figure 14:
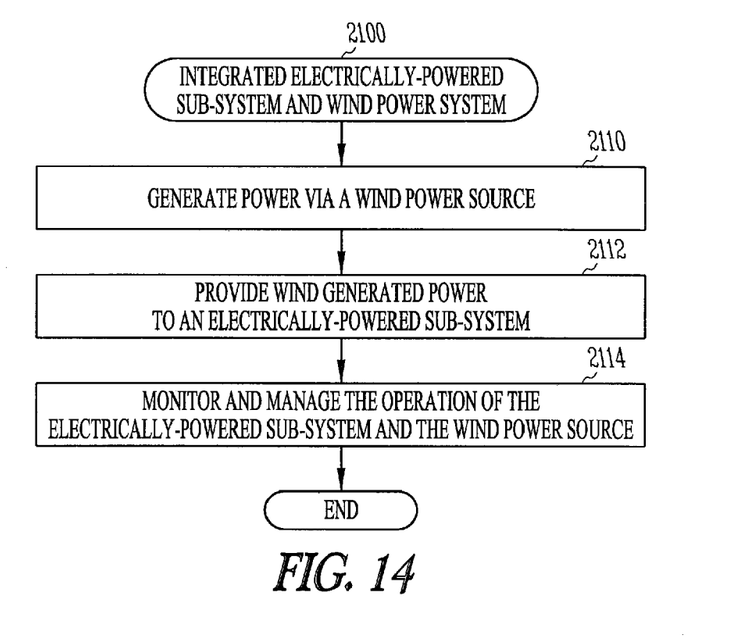
FIGS. 14-16 are flow diagrams illustrating the method steps in various embodiments.
Figure 15:
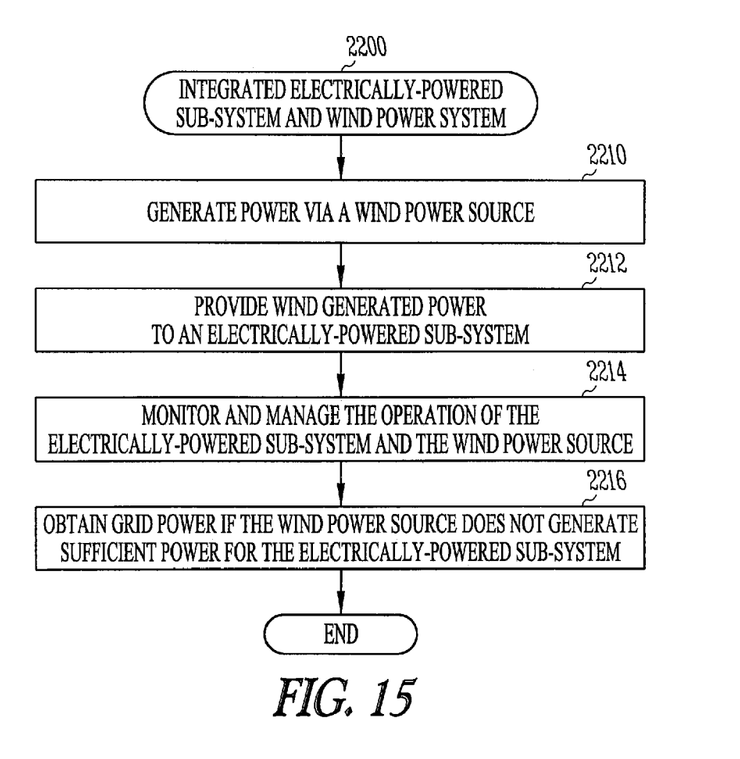
Figure 16:
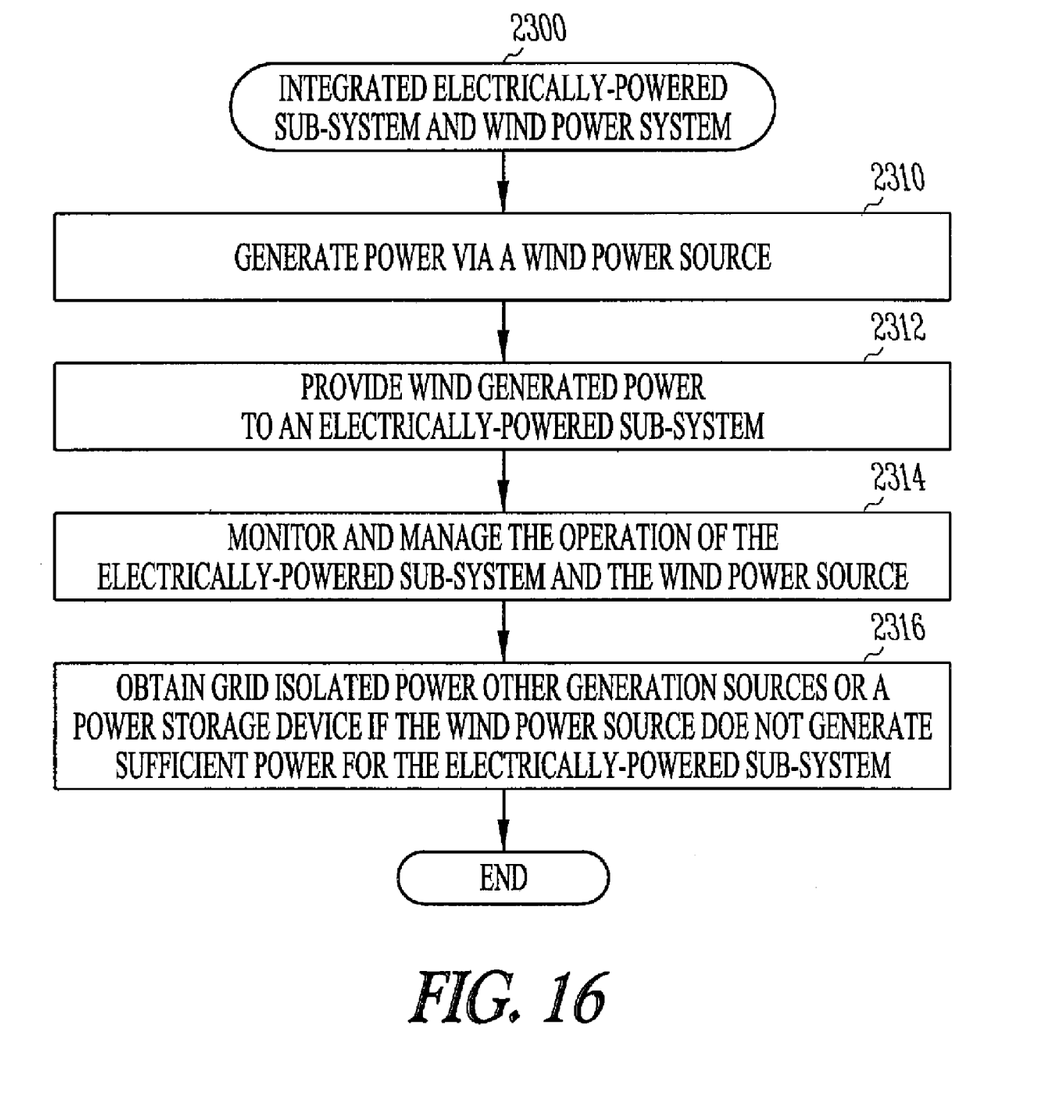

FIGS. 14-16 are flow diagrams illustrating exemplary methods used in various embodiments. In FIG. 14, power is generated using a wind power source, such as the wind power sources described above (processing block 2110). The wind generated power is provided to an electrically-powered sub-system in one of various design configurations described above (processing block 2112). A supervisory controller monitors and manages the operation of the electrically-powered sub-system and the wind power source in processing block 2114.

In FIG. 15, power is generated using a wind power source, such as the wind power sources described above (processing block 2210). The wind generated power is provided to an electrically-powered sub-system in one of various design configurations described above (processing block 2212). A supervisory controller monitors and manages the operation of the electrically-powered sub-system and the wind power source in processing block 2214. If the wind power source cannot generate sufficient power for the electrically-powered sub-system, grid power is obtained to sustain the power requirements of the electrically-powered sub-system (processing block 2216). Additionally, if the wind power source generates a surplus of power, the surplus power can be sold to the grid.

In FIG. 16, power is generated using a wind power source, such as the wind power sources described above (processing block 2310). The wind generated power is provided to an electrically-powered sub-system in one of various design configurations described above (processing block 2312). A supervisory controller monitors and manages the operation of the electrically-powered sub-system and the wind power source in processing block 2314. If the wind power source cannot generate sufficient power for the electrically-powered sub-system, grid isolated or grid disconnected power is obtained to sustain the power requirements of the electrically-powered sub-system (processing block 2316). As described above, the grid isolated power can be provided by other generation sources, such as fuel cells, combustion engines (e.g. diesel motors), or power storage devices including batteries. Additionally, if the wind power source generates a surplus of power, the surplus power can be used to charge batteries or other power storage devices.

The constant operation of an integrated electrically-powered sub-system and wind power plant according to the various embodiments is one of many possible operating strategies. For the same capital expenditure, the plant operator may prefer to produce less output from the electrically-powered sub-system when grid power is expensive (decreasing the operating costs) and increase output from the electrically-powered sub-system when wind is available. Accordingly, the optimal size of an integrated electrically-powered sub-system and wind power plant is closely dependent on the chosen strategy.

For a grid-connected operation, the plant operation configuration setpoints include not only the grid-isolated topology setpoints (e.g. water pump speeds, number of active vessels, recirculation flows), but also the ones corresponding to the power management: e.g. power used by the integrated electrically-powered sub-system and wind power plant, power bought or sold from/to the grid, and power drawn from or stored in the batteries (if available). The operation of an integrated electrically-powered sub-system and wind power plant can take into account the forecast for wind speeds, and energy prices to make well-informed decisions to manage the energy storage.

The embodiments described herein are examples of systems and methods having elements corresponding to the elements of the various embodiments recited in the claims. This written description may enable one of ordinary skill in the art to make and use embodiments having alternative elements that likewise correspond to the elements of the various embodiments recited in the claims. The scope thus includes methods and systems that do not differ from the literal language of the claims, and further includes other methods and systems with insubstantial differences from the literal language of the claims. While only certain features and embodiments have been illustrated and described herein, many modifications and changes may occur to one of ordinary skill in the relevant art. The appended claims are intended to cover all such modifications and changes.

What is claimed is:

1. An integrated electrically-powered sub-system and wind power system, comprising:
    a wind power source;
    an electrically-powered sub-system coupled to and at least partially powered by the wind power source, the electrically-powered sub-system being coupled to the wind power source though power converters; and
    a supervisory controller coupled to the wind power source and the electrically-powered sub-system to monitor and manage the integrated electrically-powered sub-system and wind power system, and
    further including a transformer to couple the wind power source and the electrically-powered sub-system to grid power, and
    further including back-to-back power converters to couple the transformer to the electrically-powered sub-system.

2. The integrated electrically-powered sub-system and wind power system of claim 1 further including a power converter to couple the electrically-powered sub-system to a direct current link of the back-to-back power converters.

3. The integrated electrically-powered sub-system and wind power system of claim 1 wherein the wind power source is a doubly fed induction wind turbine generation system.

4. The integrated electrically-powered sub-system and wind power system of claim 1 wherein the wind power source is selected from the group consisting of: a permanent magnet wind power generation system and a squirrel cage induction-type wind power generation system.

5. The integrated electrically-powered sub-system and wind power system of claim 1 wherein the wind power source is a wind farm.

6. The integrated electrically-powered sub-system and wind power system of claim 1 wherein the electrically-powered sub-system is a reverse osmosis desalination system.

7. An integrated electrically-powered sub-system and wind power system, comprising:
    a wind power source;
    an electrically-powered sub-system coupled to and at least partially powered by the wind power source, the electrically-powered sub-system being coupled to the wind power source though power converters; and
    a supervisory controller coupled to the wind power source and the electrically-powered sub-system to monitor and manage the integrated electrically-powered sub-system and wind power system, and
    further including a transformer to couple the wind power source and the electrically-powered sub-system to grid isolated power from other sources, and
    further including back-to-back power converters to couple the transformer to the electrically-powered sub-system.

8. The integrated electrically-powered sub-system and wind power system of claim 7 wherein the grid isolated power from other sources is selected from the group consisting of: a fuel cell, a combustion engine, flow batteries, and combinations of two or more thereof.

9. The integrated electrically-powered sub-system and wind power system of claim 7 further including an energy storage source coupled to a direct current link of the back-to-back power converters.

10. The integrated electrically-powered sub-system and wind power system of claim 9 further including a power converter to couple the energy storage source to the direct current link of the back-to-back power converters.

11. The integrated electrically-powered sub-system and wind power system of claim 7 further including a power converter to couple the electrically-powered sub-system to a direct current link of the back-to-back power converters.

12. The integrated electrically-powered sub-system and wind power system of claim 7 wherein the electrically-powered sub-system is a hydrogen electrolysis system.

13. The integrated electrically-powered sub-system and wind power system of claim 7 wherein the electrically-powered sub-system includes a variable speed pumping system.

* * * * *